United States Patent [19]

Krstic

[11] Patent Number: 5,021,230

[45] Date of Patent: Jun. 4, 1991

[54] METHOD OF MAKING SILICON CARBIDE

[76] Inventor: Vladimir D. Krstic, 7 Lochinvar Road, Kingston, Ont., Canada, K7M 6R9

[21] Appl. No.: 323,713

[22] Filed: Mar. 15, 1989

Related U.S. Application Data

[63] Continuation-in-part of Ser. No. 41,052, Apr. 22, 1987, abandoned.

[51] Int. Cl.$^5$ .............................................. C01B 31/36
[52] U.S. Cl. ...................................... 423/345; 423/346
[58] Field of Search ............................... 423/345, 346

[56] References Cited

U.S. PATENT DOCUMENTS

| | | | |
|---|---|---|---|
| 3,754,076 | 8/1973 | Cutler | 423/345 |
| 3,927,181 | 12/1975 | Niimi et al. | 422/345 |
| 3,933,984 | 1/1976 | Kimura et al. | 423/440 |
| 4,117,096 | 9/1978 | Hosaka et al. | 423/345 |
| 4,217,335 | 8/1980 | Sasaki et al. | 423/345 |
| 4,248,844 | 2/1981 | Ramsey, Jr. et al | 423/345 |
| 4,276,275 | 6/1981 | Ando et al. | 423/345 |
| 4,283,375 | 8/1981 | Horne, Jr. et al. | 423/345 |
| 4,342,837 | 8/1982 | Suzuki et al. | 501/90 |
| 4,368,181 | 1/1983 | Suzuki et al. | 423/345 |
| 4,387,080 | 6/1983 | Hatta et al. | 423/345 |
| 4,446,169 | 5/1984 | Castle et al. | 427/53.1 |
| 4,504,453 | 3/1985 | Tanaka et al. | 423/345 |
| 4,529,575 | 7/1985 | Enomoto et al. | 423/345 |
| 4,543,240 | 9/1985 | Goldberger | 423/346 |
| 4,605,542 | 8/1986 | Harada | 423/345 |
| 4,637,924 | 1/1987 | Beatty et al. | 423/345 |

FOREIGN PATENT DOCUMENTS

| | | | |
|---|---|---|---|
| 695133 | 9/1964 | Canada | 23/54 |
| 782522 | 4/1968 | Canada | 23/54 |
| 795250 | 9/1968 | Canada | 23/54 |
| 1084235 | 5/1977 | Canada | 23/54 |
| 1156424 | 11/1983 | Canada | 23/54 |
| 2848377 | 1/1980 | Fed. Rep. of Germany | 423/345 |
| 58-120599 | 7/1983 | Japan . | |

OTHER PUBLICATIONS

Communications of the American Ceramic Society—Jul., 1983.

P.M. Ceramic Society Bulletin (U.S.A. )—Feb. 1975.

Primary Examiner—Olik Chaudhuri
Assistant Examiner—Lori F. Cuomo
Attorney, Agent, or Firm—Rogers, Bereskin & Parr

[57] ABSTRACT

A process for production of high purity, sub-micron size, silicon carbide by reacting a mixture of silica powder and carbon powder in a mixing reactor. The reactor, initially pressurized with a non-reactive gas, is indirectly heated and when the charge reaches reaction temperature a vacuum is applied. The charge is kept under a high vacuum until the reaction is complete, and is agitated to encourage release of carbon monoxide. After removal of excess carbon by low temperature oxidation, the product typically contains in excess of 99.5% silicon carbide of the beta-phase, has a surface area greater than 10m$^2$/gm, is free of carbon and contains no detectable unreacted silica. The product requires no post production treatment such as grinding and acid leaching.

17 Claims, 1 Drawing Sheet

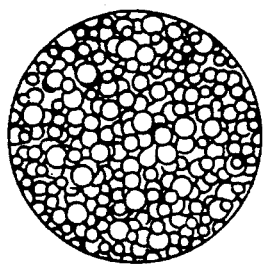
FIG.1
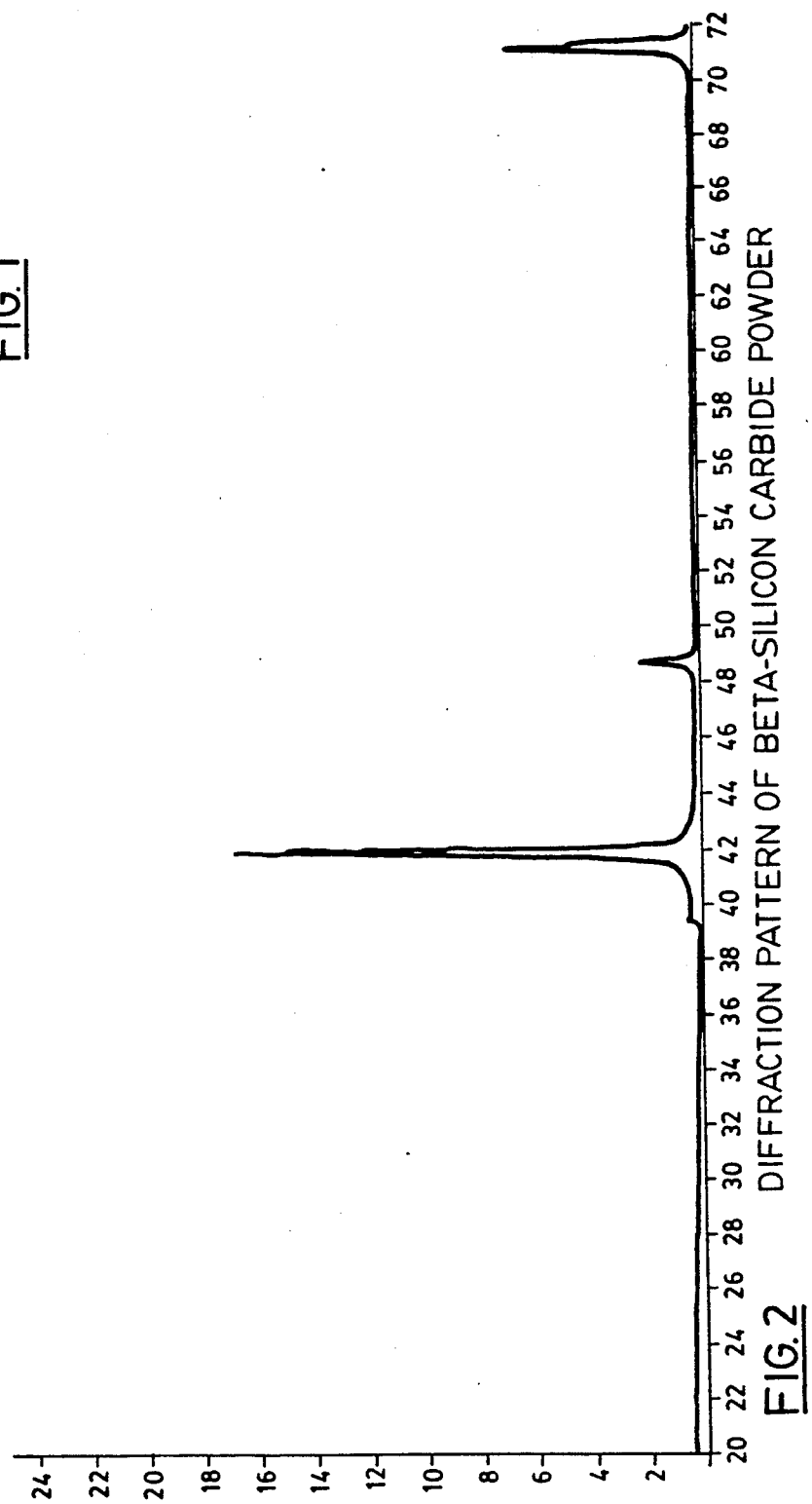
FIG.2 DIFFRACTION PATTERN OF BETA-SILICON CARBIDE POWDER

METHOD OF MAKING SILICON CARBIDE

CROSS-REFERENCE TO RELATED APPLICATION

This application is a continuation in part of my application No. 041,052, filed Apr. 22, 1987 Now Abandoned.

FIELD OF INVENTION

This invention relates to a method of making silicon carbide and more particularly relates to a method of making high purity, sub-micron sized beta-phase silicon carbide powder.

BACKGROUND OF THE INVENTION

Beta-phase silicon carbide is a material which can withstand high temperatures, has good thermal shock resistance, good abrasion resistance, good corrosion resistance and maintains its strength well at high temperatures. Beta-phase silicon carbide therefore has excellent potential as a base material for the production of pressureless sintered components which are required to withstand high temperatures and stresses, which are experienced, for example, in automotive and gas turbine components.

An ultra-fine beta silicon carbide powder is desirable in order to minimize shrinkage and optimize sinterability.

High purity silicon carbide in this specification including the claims refers to a product containing in excess of 99.5% by weight of silicon carbide.

Although a number of processes for the production of silicon carbide have been disclosed in prior art, none appear to have the potential of producing large scale quantities of low cost, high quality powders. Existing processes for making silicon carbide start with a mixture of either elemental silicon or silicon dioxide (silica) and carbon. It is preferable to manufacture silicon carbide using silica as a raw material because it is readily available in reasonably pure form at significantly less cost than elemental silicon.

Much of the silicon carbide produced today is manufactured by the Acheson process. This process involves mixing silica sand and carbon from various sources and reacting them in an electrical furnace at an extremely high temperature of over 2400° C., to produce coarse, highly crystallized, mostly alpha-phase silicon carbide. The manufacture of a fine, sinterable powder requires a series of crushing and milling operations, each followed by acid cleaning to remove metal contamination. The average particle size of silicon carbide obtained by the milling may be as low as ten microns, but for engine and other advanced technology applications, still finer powders are required. The process of milling to reach micron and sub-micron size powders greatly increases the production costs and makes the Acheson process economically unacceptable.

U.S. Pat. No. 4,276,275 describes a method for making fine powder by reacting a carbon electrode with expensive elemental silicon. The equipment is a vacuum chamber pressured with an inert gas and the product is collected by scraping the walls of the vessel.

Another method of producing beta silicon carbide is described in U.S. Pat. No. 4,368,181. In this method, since the starting mix of raw materials does not have excess carbon to react with gaseous silicon monoxide (SiO) and thus to prevent excessive silica losses, a two-temperature zone furnace had to be designed. Highly volatile silicon monoxide formed in the high temperature zone is condensed in the low temperature zone and is then converted into beta-phase silicon carbide in the next firing cycle. To produce a powder of (relatively) high silicon carbide content, repeated re-firing operations are necessary. The analysis of the product listed in the examples in this patent show the presence of unreacted silica. This suggests that this process is not suitable for the production of a fully reacted powder.

In many of the earlier processes, the removal of carbon monoxide gas is achieved by non-reactive gas flushing, venting to atmosphere or applying a vacuum. None of the earlier processes teach the use of extremely low absolute pressures of less than 500 millitorr, as is taught by the present invention. On the contrary, an early proposal in Canadian Patent No. 782,522 (Dietz) teaches that too great a vacuum should not be applied to the system as it will result in the decomposition of the silicon carbide product according to the reaction:

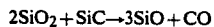

$$2SiO_2 + SiC \rightarrow 3SiO + CO$$

It further specifies that the partial pressure of carbon monoxide should be kept within limits determined by temperature. Process conditions employed by Dietz did not result in complete conversion to silicon carbide as shown by the need to remove silica by hydrofluoric acid leaching.

German Published Patent Application No. 2,848,377 discloses a process for making beta-phase silicon carbide of surface area greater than $5m^2/g$ from silicic acid and acetylene black. The disclosure is very specific as to the type of raw materials utilized, both the silicic acid powder and carbon powder are required to have a surface area of at least $100m^2/g$ and the silicic acid has to be of a highly dispersed type. The patent describes a specific way of mixing and kneading the raw materials with the presence of a large amount of water, which must be removed by drying prior to processing. The patent also stresses the need to mold the mixed wet raw materials in order to obtain the required surface area of the powder. The dried, extruded shapes are heated to 1300°–1700° C. in either a flowing inert gas or a vacuum of less than $75 \times 10^3$ millitorr (100 millibars).

Silicic acid powder and carbon powder having surface areas in the range of $100m^2/g$ would correspond to powders having particle sizes in the range of $10^{-2}$ microns or less. These are extremely fine powders and would be quite costly as raw materials. It has been found that a vacuum of 60-100mbar is not sufficient to promote the complete conversion of silica or silicic acid to silicon carbide, where carbon having a particle size of 0.3 microns is used either in combination with silicic acid having a surface area of $100m^2/g$ or coarser silica having a particle size of 45 microns. A review of the examples in this German Patent No. 2,848,377 indicates that even using the extremely fine powders suggested, the product contains unreacted feedstock and it contains less than 99.5% silicon carbide. Furthermore, it has been found that the application of a vacuum of 100mbar during the heating up period causes significant material losses as silicon monoxide forms a vapour at a temperature below that of silicon carbide formation and this vapour is drawn off by the vacuum source.

SUMMARY OF THE PRESENT INVENTION

It is desirable to produce, on a commercial scale, high-purity, sub-micron size, beta silicon carbide powder from readily available, low cost raw materials, in one temperature cycle without significant losses of silicon monoxide.

In accordance with the present invention there is provided a method of making beta silicon carbide powder, comprising mixing carbon powder with silica powder, as reactants; heating the reactants in a reaction chamber under a non-reactive gas pressure which maintains a carbon monoxide partial pressure sufficient to keep the loss of silicon monoxide to an acceptable level until the reactants reach a temperature of between 1,200 and 2,000° C.; subsequently maintaining the temperature of the reactants between 1,200° and 2,000° C. to cause the reactants to react to form silicon carbide and carbon monoxide while agitating the carbon and silica powder mixture and applying a sub-atmospheric pressure to the reactants which is less than the pressure in the first step and which pressure is sufficient to remove carbon monoxide gas from the reaction chamber and to drive the reaction to substantial completion. Any residual carbon can be subsequently removed by oxidation at a reduced temperature.

The reduced pressure is preferably less than 500 millitorrs and more preferably less than 100 millitorrs and greater than 50 millitorrs. The pressure should not be so low as to draw off either the reactants or the product. An acceptable minimum pressure will depend on the vapour pressure of the reactants and the product, which will depend on the temperature during the final step of the process.

BRIEF DESCRIPTION OF THE DRAWINGS

For a better understanding of the present invention and to show more clearly how it can by carried into effect, reference will now be made, by way of example, to the accompanying drawings, in which:

FIG. 1 shows a scanning electron micrograph of beta-phase silicon carbide powder produced by the method of the present invention.

FIG. 2 shows a graph of X-ray data of the silicon carbide powder produced by the present invention.

DESCRIPTION OF THE PREFERRED EMBODIMENT

When silica is mixed with carbon black and heated to a high temperature, the reaction of silicon carbide formation may be viewed as proceeding in the following steps:

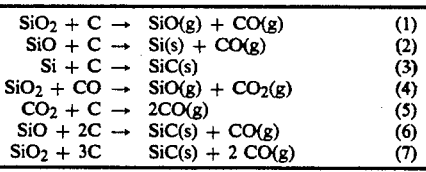

| | | |
|---|---|---|
| $SiO_2 + C \rightarrow$ | $SiO(g) + CO(g)$ | (1) |
| $SiO + C \rightarrow$ | $Si(s) + CO(g)$ | (2) |
| $Si + C \rightarrow$ | $SiC(s)$ | (3) |
| $SiO_2 + CO \rightarrow$ | $SiO(g) + CO_2(g)$ | (4) |
| $CO_2 + C \rightarrow$ | $2CO(g)$ | (5) |
| $SiO + 2C \rightarrow$ | $SiC(s) + CO(g)$ | (6) |
| $SiO_2 + 3C$ | $SiC(s) + 2 CO(g)$ | (7) | where the standard free energy change ($\Delta G°$) at one atmosphere pressure for the overall reaction (7) is given by the expression:

$$\Delta G°T = 590.36 - 0.331T \, KJ/mol$$

where T is the temperature in degrees Kelvin.

In the course of the experimental work in the development of the present invention, it was found that the formation of gaseous silicon monoxide (SiO), reactions (1) and (4), is one of the most critical parameters in the overall carbothermic reduction of silica to silicon carbide. Further, unlike earlier proposals which generally specify just one set of conditions for the entire process, it has been discovered and realized that process can be divided into two distinct steps, namely: (i) a heating step in which the reactants are heated to the reaction temperature; and (ii) a reaction step in which the reactants are held at the desired, elevated reaction temperature.

As can be seen from the above reactions, the formation of silicon carbide requires a series of solid-solid and solid-gas reactions to take place and this is accompanied by the evolution of carbon monoxide gas in large quantities. As the standard free energy for reaction (7) at one atmosphere pressure is positive up to 1510° C., it has been realized that it is necessary to keep the system under a positive pressure until the reaction temperature for reaction (7) has been reached, the reaction temperature being the temperature at which reaction (7) occurs at an adequate rate. Therefore, it is proposed to maintain a high carbon monoxide partial pressure during the initial heating step, so as to prevent loss of silicon monoxide gas through reaction (1). Whilst this also inhibits reaction (7), this is immaterial during the heating step. This is achieved by the application of positive pressure with a non-reactive gas such as argon, carbon monoxide etc. at temperatures too low for reaction (7) to proceed. Once the silicon carbide reaction temperature is reached, the second step is commenced and a different set of process conditions applied. As the presence of carbon monoxide inhibits reaction (7), high temperatures are required to promote reaction (7) unless carbon monoxide is removed from the system. It has further been found that carbon monoxide not only inhibits the rate of reaction but also prevents the reaction from going to completion during reasonable reaction times. Evidence of this is shown repeatedly by the presence of silica in the reaction products of examples described below made in accordance with earlier methods. It has been experimentally found that if the carbon monoxide is not removed by applying a vacuum of at least 500 millitorr, the reaction does not go to completion. Thus, during the second step, the reaction temperature is maintained, and such low carbon monoxide partial pressures are applied. Even applications of this amount of vacuum is insufficient to promote complete reaction (removal of all oxygen) unless the bed of reactants is very thin or the bed is turned, mixed, agitated etc. during the silicon carbide formation in order to allow passage of the reaction inhibiting carbon monoxide gas. At these very low pressures, any pressure differential necessary to drive carbon monoxide through a bed of reactants can significantly affect the carbon monoxide partial pressure within the bed. A further advantage of agitation is that it promotes heat transfer in the reactants, as the reaction is highly endothermic.

Various methods can be used for agitation of the bed of reactants. These include introducing non-reactive mixing media into the bed which can be moved through the bed either separately or can be tumbled through the bed by rotation of the reaction chamber. Typical non-reactive media would include silicon carbide balls. Alternatively, if the reactants are pelletized prior to introduction into the reaction chamber, rotation of the reaction chamber will cause agitation of the reactants by tumbling of the pellets. Pelletizing the reactants will result in mild agglomeration of the product, but the agglomerates thus formed are quite friable and separate with little pressing, therefore not requiring extensive crushing or grinding to reduce particle size. For small batch production, e.g. for experimental or laboratory purposes, adequate quantities may be producable using a static thin bed. In this specification, including the claims, the term "agitate" encompasses all such methods as give adequate carbon monoxide removal from the reactants into the reaction chamber.

In the present invention, powders of carbon, which may come from various sources, preferably carbon black or milled petroleum coke, are mixed with silica which also may come from various sources, preferably silica sand, in $C/SiO_2$ molar ratios ranging from 2.9 to 6. In accordance with the present invention the reacting mixture may be made by employing carbon black containing a minimum of 99.5 wt% of elemental carbon, generally of particle size below 1 micrometer (micron) which is preferably either crystallized amorphous material or a mixture of partly amorphous and partly crystallized material.

The quality of the silica ingredient is an important factor in determining the quality of the end product and should consist of a minimum 99 wt% $SiO_2$, preferably above 99.6 wt% $SiO_2$. Using the process of the present invention some of the impurities which may be present in the raw material may be removed as carbonyls during the reaction under vacuum. This occurs due to the very low pressures and is generally not found in the prior art processes.

The initial size of the silica component required to produce sub-micron size beta-phase silicon carbide powder, is comparatively less important than is the initial size of the carbon component. This suggests that silicon carbide formation takes place on the carbon particles via a silicon monoxide gas-solid carbon reaction, rather than on the silica particles. The initial average particle size and particle size distribution of carbon powder will limit the fineness of the final product and should be selected according to the desired product fineness. Preferably, the particle size of carbon component will be less than one micrometer if the desired product particle size is to be less than one micrometer. To minimize reaction times, the maximum initial particle size of the silica component should be 45 micrometers, preferable though substantially less than 45 micrometers.

A well homogenized mix of silica and carbon as described above was prepared in a commercially available dry powder mixer where mixing times in the range of 5 to 20 minutes per batch were found to be sufficient. The mixed material, either as a powder or pelletized, was introduced into a graphite boat or cylinder and inserted into an electrical resistance heated graphite furnace designed to operate under pressure and vacuum. While graphite was used in this work, it will be appreciated that one can use materials which will withstand the process conditions and not react with the reactants or products. Other suitable materials are silicon carbide and molybdenum.

It has been discovered in the present invention that below about 1400° C. the reactions producing SiO gas [i.e. reactions (1) and (4)] are significantly more favourable than the silicon carbide formation reactions [(3) and (6)]. In order to avoid excessive loss of silica component during the heating stage, the system is pressured with a non reactive gas such a argon, carbon monoxide etc. and maintained until reaction temperature [for reaction (3) and (6)] has been obtained. It has been discovered that a pressure of 0.034 MPa (5 psig) above atmospheric is sufficient to inhibit reactions (1) and (4) and thereby limit the loss of SiO gas below about 1400° C.

Above about 1400° C., kinetically, the rate of silicon carbide formation is relatively high and a vacuum is applied to the reaction chamber in order to promote removal of carbon monoxide and to enhance the reaction of silicon carbide formation. The system was evacuated until the pressure was between 50 to 300 millitorr. Simultaneously with the application of vacuum, the bed of the homogeneous reactant mix was turned to agitate the reactants in order to destroy regions rich in silica, due to the extensive migration of the volatile SiO component and to promote free passage of the reaction inhibiting carbon monoxide gas. It has been found in the present invention, that SiO gas formed in the initially homogeneously mixed sample migrates throughout the bed of solid reactants and frequently condenses in carbon monoxide rich regions in the form of unreacted silica which slows down the silicon carbide formation reaction and ultimately leads to poor conversion to silicon carbide. Continuous turning or agitation of an initially homogeneous mix, employed for the first time in this invention, was found to be essential for the production of large quantities of high and re-producible quality silicon carbide powders. Additionally, the combination of high vacuum and continuous bed turning or agitation provide the condition for the production of fully reacted silicon carbide at temperatures as low as 1300° C.

The conversion time required is directly related to (a) reaction temperature, (b) reactant particle size, (c) level of vacuum applied and (d) rate of bed agitation.

After the reaction of silicon carbide formation was complete, the silicon carbide product and residual carbon were discharged from the furnace. The free carbon content of the furnace discharge depends on the $C/SiO_2$ molar ratio in the original homogeneous mix (which also influences the surface area of the product) and typically ranges from 0 to 50 per cent carbon by weight.

The excess carbon was removed by low temperature oxidation (400°–700° C.) in air for times typically ranging from 1 to 6 hours. Whether such oxidation is done in the reaction chamber or whether the products are first discharged from the reaction chamber depends on whether the materials used for the reaction chamber and for the reactant container are prone to oxidation and also the desired sequence of production.

Unreacted silica as measured by oxygen content via fast neutron activation was undetectable. The beta-phase silicon carbide produced by this process contained a minimum of 99 wt % silicon carbide, normally 99.5 wt %, had an average particle size less that one micron and contained no detectable free, unreacted carbon. The specific surface area of the beta-phase silicon carbide powder was a minimum of $4m^2/g$, typically greater than $10m^2/g$. The relative surface area of the powder depends on (a) processing temperature, (b) reaction time, (c) reactant particle size and (d) $C/SiO_2$ molar ratio in the homogeneous mix. During oxidation of the free carbon, mild oxidation of the particle surface increases the measurable oxygen content to less than 0.5wt%.

It is to be understood that the process as described above is a preferred embodiment of the invention and the values given for temperatures, particle size, pressures and mix composition are those desired to produce beta silicon carbide of high purity and of sub-micron size. Silicon carbide of lesser purity and at lower reaction rates can however be produced by deviating from the values of temperature pressure and reactant particle size and purity, set out above while remaining within the scope of the invention. For example, the reaction temperature can vary from the lowest values, that will give a negative free energy change at the reduced pressures used, which is approximately 1200° C., to a maximum at which volatization of the constituent components becomes significant, which is about 2000° C. Preferably, the reduced pressure is varied from about 50 millitorrs to about 500 millitorrs absolute pressure. The non-reactive gas pressure can vary from atmospheric to whatever the process equipment can withstand. Similarly, the level of agitation will be determined by the purity required.

An important advantage of the present invention is that very precise control of oxygen and therefore unreacted silica in the product can be maintained, thus giving a product of consistent quality which does not require post manufacturing acid treatment and grinding.

EXAMPLE 1

For comparison purposes, this example was prepared and carried out using silica and carbon powders of a size capable of giving good results using the process of the present invention but using argon gas to flush the system rather than applying a vacuum.

952 grams of silica flour (44μm Ottawa silica ("μm"="micrometer" or "micron")) was thoroughly mixed with 548 grams of medium thermal carbon black (mean particle size 0.3μm). This mix having a molar excess of 0.04 moles of silica was pelletized to produce 3mm spherical pellets. The dried pelletized charge was placed in a static graphite cruicible and heated for three hours at 1600° C. under an inert argon gas pressure of 1 atmosphere, the argon gas being continuously flushed through the system. Experimental results and powder characteristics are as follows:

| Charge | | L.O.I. | B.E.T. | Unreacted |
|---|---|---|---|---|
| gm in | gm out | % | m$^2$/gm | silica wt % |
| 1500 | 1260 | — | 2.2 | 41 |

The powder contained a large amount of unreacted silica and had a low surface area and therefore fails to meet the desired result of greater than 99.5 wt % silicon carbide and greater than 10m$^2$/gm surface area. [L.O.I. stands for Loss On Ignition, and B.E.T. is a standard test for determining particle size by surface area per unit mass.]

EXAMPLE 2

For comparison purposes, this example was prepared and carried out using silica and carbon powders of a suitable size to give good results in accordance with the present invention. The materials used were the same as in Example 1. However, the amount of vacuum applied was 60 millibars which is suggested by German published patent application No. 2,848,377 as giving the best results. It is to be noted that the silica size in this example was approximately 4 or 5 orders of magnitude larger than that suggested by the German patent and the carbon is one or two orders of magnitude larger.

1500 grams of material as specified in Example 1 was placed in a static graphite crucible and heated for 3 hours at 1600° C. under a vacuum of 60 millibars (45,000 millitorr). The experimental results are as follows:

| Charge | | L.O.I. | B.E.T. | Unreacted |
|---|---|---|---|---|
| gm in | gm out | % | m$^2$/gm | silica wt % |
| 1500 | 980 | — | 7.2 | 10 |

The powder thus obtained had a substantially larger surface area, but with unacceptable large amounts of unreacted silica. This shows that the technique of the German patent application 2,848,377 is incapable of producing high purity silicon carbide using reactants of the particle size given above, and it is believed that the process of this German patent would produce similarly poor results even using the very fine powders in that published application.

EXAMPLE 3

For comparison purposes, this example was prepared and carried out using silicic acid rather than silica, the silicic acid having a surface area of the minimum claimed in the German published patent application No. 2,848,377. The particle size of the carbon powder was 1 or 2 orders of magnitude larger than taught by the German patent, and of a size which produces good results according to the present invention. The amount of vacuum was consistent with what the German patent teaches as providing the best results.

100 grams of silicic acid (H$_2$SiO$_3$) with a specific surface area of 100m$^2$/gm and 44.4 grams of carbon (as specified in Example 1) were thoroughly mixed with water and pelletized to 3–4mm spheres. The spheres were then dried, so as to give lumps having a surface area to size ratio similar to that given in the German patent application. The dried charge was placed in a static graphite cruicible and heated for 3 hours at 1600° C. under a vacuum of 60 millibar (45,000 millitorr). The experimental results were as follows:

| Charge | | L.O.I. | SiO$_2$ | B.E.T. | Unreacted |
|---|---|---|---|---|---|
| gm in | gm out | % | loss % | m$^2$/gm | silica wt % |
| 70 | 26 | 10.5 | 15.6 | — | 30 |

The high unreacted silica content makes this powder technically unacceptable. The high reactivity of this material and preferential formation of gaseous silicon monoxide (SiO) at temperatures below the silicon carbide formation temperature, while under vacuum, resulted in large silicon losses. However, once at the reaction temperature, the presence of sufficient carbon monoxide (CO) at 60mb prevented the reaction from going to completion.

EXAMPLE 4

For comparison purposes, this example was prepared and carried out using silica and carbon powders and a level of vacuum which have been found to give good results using the method of the present invention, namely the powders as for Example 1. This example differs from the present invention in that the vacuum was applied during heating of the reactants up to the reacting temperature and the bed of reactants was not turned or agitated.

1500 grams of a mixture of silica flour and carbon as specified in Example 1 was placed in a static graphite cruicible and heated for 3 hours at 1600° C. under a vacuum of 100 millitorr. The experimental results were as follows:

| Charge | | L.O.I. | B.E.T. | Unreacted |
|---|---|---|---|---|
| gm in | gm out | % | m²/gm | silica wt % |
| 1500 | 220 | — | 5.72 | 2.6 |

The powder thus obtained has an intermediate surface area, but still with an unacceptable amount of unreacted silica. From this, it is concluded that without continuous turning of bed of reactants, even a vacuum of 100 millitorr is not sufficient to assure passage of reaction inhibiting carbon monoxide through the bed. Maintaining a vacuum during the heating up phase (before the silicon carbide formation temperature is reached) resulted in high silica losses (theoretical yield for the 1500 g charge is 609.7 g).

EXAMPLE 5

Was prepared and carried out in accordance with the present invention.

1500 grams of material, as specified in Example 1, was placed in a graphite tube inside the hotzone of a furnace. The tube was continuously turned at 1 r.p.m. The furnace was placed under a positive pressure of 10 psig with carbon monoxide gas (CO) and heated to 1600° C. When this reaction temperature was reached, the pressure was released and a vacuum was applied to establish and maintain a vacuum of 100 millitorr. The experimental results were as follows:

| Charge | | L.O.I. | Yield | Reaction | B.E.T. | Unreacted |
|---|---|---|---|---|---|---|
| gm in | gm out | % | % | time (m) | m²/gm | silica wt % |
| 1000 | 390 | 5.3 | 90.8 | 80 | 7.8 | 0.5 |

Whilst there has been some loss of silicon, this is not excessive and it is quite acceptable. The powder meets the desired requirements of surface area and oxygen content (silica). It has a purity of 99.5%.

EXAMPLE 6

This example was prepared and carried out according to the present invention.

1000 grams of material as specified in Example 1 was reacted as in Example 5 except that the temperature of reaction was lowered to 1450° C. The experimental results were as follows:

| Charge | | L.O.I. | Yield | Reaction time | B.E.T. | Unreacted |
|---|---|---|---|---|---|---|
| gm in | gm out | % | % | (min) | m²/gm | silica wt % |
| 1000 | 360 | 4.6 | 84.5 | 120 | 12.9 | 0.5 |

This powder has a high surface area and low silica content, giving 99.5% purity. It therefore meets the technical requirements for high purity, silicon carbide having a surface area within the desired range.

EXAMPLE 7

This example was alsO prepared and carried out according to the present invention using very fine silica and carbon powders.

600 grams of silica powder with a specific surface area of 100m²/gm was mixed with 720 grams of carbon black of specific surface area of 200 m²/gm. The mixture including water was pelletized and then dried to produce 3-4 mm spherical pellets. 1000 grams of this dried material was reacted as in Example 5 except at a temperature of 1350° C. The experimental results were as follows:

| Charge | | SiC | L.O.I. | Yield | Reaction time | B.E.T. | Unreacted |
|---|---|---|---|---|---|---|---|
| gm in | gm out | % | % | % | (min) | m²/gm | silica wt % |
| 1000 | 460 | 99.5 | 53.5 | 81.2 | 55 | 23.2 | 0.5 |

This powder has an extremely high surface area, high silicon carbide content and low unreacted silica content. The high surface area of the feedstock made the material highly reactive, however, and without the use of high vacuum a low unreacted silica content cannot be assured.

It is to be understood as suggested above that continuous turning of the bed is only a preferred method of promoting the reaction and that other mechanical ways of promoting the reaction may be employed while remaining within the scope of the invention.

Beta silicon carbide produced by the examples according to the present invention, namely examples 5, 6 and 7, contained a minimum of 99.5% silicon carbide by weight. For examples 5 and 6, the average particle size was less than 1 micron whilst for example 7 it was considerably less. A typical scanning electron micrograph of silicon carbide powder produced by the method of the present invention is shown in FIG. 1. The silicon carbide produced by this process is mostly of beta-phase with a small amount of alpha-phase silicon carbide present. This is illustrated by the X-ray data plotted in FIG. 2 of a silicon carbide powder produced by the above process. The specific surface area of the beta-silicon carbide powder is of minimum m²/g. The relative amount of beta-silicon carbide and specific surface area of the powder is dependent on the firing temperature and reaction time, as noted above.

As the beta-silicon carbide produced by this method contained less than 0.5% unreacted silica, no further post-fabrication processing to remove the residual silica was required.

It is to be understood that the process as described above is a preferred embodiment of the invention and the values given for temperatures, particle sizes and pressures are those desired to produce beta-phase silicon carbide of high purity and sub-micron particle size. Silicon carbide of lesser purity and at lower reaction rates can however be produced by deviating from the values of temperature, pressure and particle size set out above while remaining within the scope of the invention. For example, the reaction temperature can vary from the lowest values that will give a negative free energy change at the reduced pressures used, which is approximately 1200 degrees C. to a maximum at which volatization of carbon becomes significant which is about 2000 degrees C. At lower temperatures, due to the slower rate of reaction of silicon monoxide with carbon, more silicon monoxide would be lost. Preferably the amount of reduced pressure is varied from about 50 millitorrs, below which carbon vapourization becomes significant to about 500 millitorrs absolute pressure. The inert gas pressure can range from atmospheric to whatever the process equipment can withstand.

The amount of reduced pressure maintainable in the system is an indication of the amount of oxygen in the system and is indicative of the completeness of the silicon carbide formation in the system.

Generally, the production of coarse silicon carbide is not so difficult, and other processes are available. However, where coarser silicon carbide is acceptable or required, coarser starting powder can be used. Thus, the silica powder could be as large as, for example, 200 microns. Similarly, the carbon powder, which apparently controls the fineness of the product, could also possibly have a size up to 100 or 200 microns.

I claim:

1. A method of making beta-silicon carbide powder, comprising mixing carbon powder with silica powder, as reactants, the method comprising the steps of: ,(i) heating the reactants in a reaction chamber under a non-reactive gas pressure which is equal to or greater than atmospheric pressure, which maintains a carbon monoxide partial pressure sufficient to prevent significant loss of silicon monoxide until the reactants reach a temperature of between 1200 and 2000 degrees C; and (ii) subsequently maintaining the temperature of the reactants between 1200 and 2000 degrees C. to cause the reactants to react to form silicon carbide and carbon monoxide, and simultaneously applying a subatmospheric pressure to the reactants which is from about 50 millitorrs to about 500 millitorrs (i), which pressure is sufficient to remove carbon monoxide gas from the reaction chamber, while agitating the reactants to allow for passage of carbon monoxide therefrom, whereby the removal of the carbon monoxide drives the reaction to substantial completion.

2. A method as claimed in claim 1, wherein each of the carbon and silica powders has a size less than 200 microns.

3. A method as claimed in claim 2, wherein the carbon powder is submicron size and the silica powder has a size less than 45 microns.

4. A method as claimed in claim 2, in which the subatmospheric pressure is an absolute pressure of less than 500 millitorrs.

5. A method as claimed in claim 4, in which the subatmospheric pressure is an absolute pressure in the range 50-100 millitorrs.

6. A method as claimed in claim 4, wherein the non-reactive gas comprises an inert gas.

7. A method as claimed in claim 6, wherein the inert gas comprises argon.

8. A method as claimed in claims 4, 6 or 7, wherein the pressure of the non-reactive gas is at least 0.034 MPa above atmospheric pressure.

9. A method as claimed in claims 2, 3 or 4 wherein the carbon and silica powder mixture is either continuously or intermittently agitated, and agitation is carried out during at least the step of maintaining the temperature whilst applying a subatmospheric pressure.

10. A method as claimed in claims 2, 3 or 4 wherein the reactants are agitated by rotating the reaction chamber.

11. A method as claimed in claims 1, 2, 3, 4 or 5 wherein the temperature at which the reactants are maintained whilst the subatmospheric pressure is applied is in the range 1400°–1800 degrees C.

12. A method as claimed in claims 6 or 7 wherein the temperature at which the reactants are maintained while the subatmospheric pressure is applied is in the range of 1400°–1800 degrees C.

13. A method as claimed in claims 2, 3 or 4, which is carried out in a reaction chamber formed from graphite, silicon carbide or molybdenum.

14. A method of making submicron size beta-silicon carbide, the method comprising the steps of: (i) mixing, as reactants, a submicron size carbon powder with silica powder having a particle size not exceeding 45 microns; (ii) continuously heating the reactants in a reaction chamber under a non-reactive gas pressure which is equal to or greater than atmosphere pressure, until the reactants reach a temperature between 1400–1800 degrees C. whilst maintaining the partial pressure of carbon monoxide at a level sufficient to prevent significant loss of silicon monoxide; and (iii) subsequently maintaining the temperature of the reactants between 1400–1800 degrees C. to cause the reactants to react to form silicon carbide and carbon monoxide, whilst applying a subatmospheric pressure to the reactants in the reaction chamber in the range 50–100 millitorrs which is less than that in step (i) and which is sufficient to remove carbon monoxide gas from the reaction chamber and to drive the reaction to substantial completion and agitating the reactants to prevent agglomeration, prevent any pressure differential of carbon monoxide developing within the reactants which would inhibit the reaction and promote heat transfer to the reactants.

15. A method as claimed in claims 2, 4 or 14, wherein the carbon powder is formed from carbon black or petroleum coke.

16. A method as claimed in claims 2, 4 or 14, wherein, after forming the silicon carbide, the silicon carbide is subjected to a temperature not exceeding 750 degrees C. in the presence of oxygen to oxidize the carbon.

17. A method as claimed in claims 1, 2 or 4, in which the subatmospheric pressure within the reaction chamber and/or rate of gas production from the reactants is monitored, to determine when the reaction has been driven to substantial completion.

* * * * *